Dec. 16, 1930.   M. J. ADAMS ET AL   1,785,171
SPOKE
Filed Nov. 23, 1928
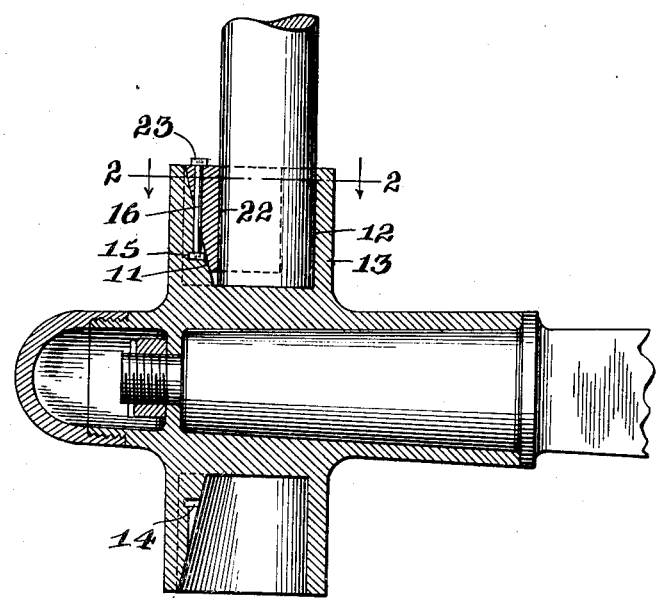
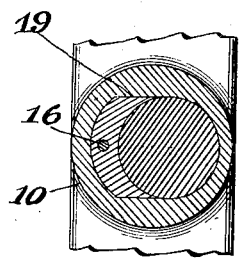
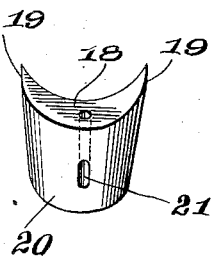
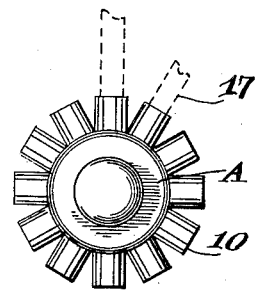
Inventors
PETER P. ADAMS
MATHIAS J. ADAMS
By Oscar A. Michel
Attorney Patented Dec. 16, 1930

1,785,171

UNITED STATES PATENT OFFICE

MATHIAS J. ADAMS AND PETER PAUL ADAMS, OF TURKEY RIVER, IOWA, ASSIGNORS OF ONE-FOURTH TO ADAMS PATENT WHEEL CO., OF TURKEY RIVER, IOWA

SPOKE

Application filed November 23, 1928. Serial No. 321,438.

This invention relates to a connection between the inner end of the spokes upon a wheel and the hub thereof.

An object of this invention is to secure the inner end of the spokes of a wheel to sockets in the hub so as to prevent transverse strains and to prevent the removal of the spoke from the hub.

A further object of the invention is to prevent any shifting of the spoke with relation to the hub.

With these and other objects in view, as will hereinafter appear our invention consists in the construction, arrangement and combination of the various parts of our device, whereby the objects contemplated are attained, as hereinafter more fully set forth, pointed out in our claims, and illustrated in the accompanying drawings, in which:

Figure 1 is a part elevational and part cross sectional view through the hub;

Figure 2 is a cross sectional view on the line 2—2 of Figure 1, and

Figure 3 is a perspective view of the type of wedge used.

Figure 4 is a side view of the hub.

In the drawings like reference characters refer to like parts.

The hub of the wheel is indicated generally at A and has projecting from the periphery thereof sockets 10 of circular formation as shown particularly in Figure 2. The interior of each socket is of a peculiar formation and as shown in Figure 1 the inside recess thereof extends parallel to the outer surface of the socket as at 12 and at the outside of the hub the interior of the socket has an inclined side 11. The incline 11 gradually becomes vertical and parallel to the outside surface 13 of the socket as it approaches the portion 12 of the socket.

At the front of the socket there is provided a T-shaped recess 14 in which is placed the head 15 of a bolt 16 which extends parallel to the outside surface 13 of the socket. The spokes are shown at 17.

In Figure 3 is shown a perspective view of the type of wedge which we employed for securing the inner end of the spoke to the hub. The wedge comprises a thick portion at 18 which gradually decreases as it approaches the edges 19 of the wedge. The wedge decreases in width also from top to bottom having the smallest thickness at 20. Extending through the thick portion of the wedge is a longitudinally extending recess 21 through which the bolt 16 is adapted to extend. The inner periphery of the wedge is perpendicular to the top surface of the wedge. It will be noted that the wedge cooperating with the inclined surface of the recess of the socket builds up a surface 22 which is at right angles to the base of the socket and parallel to the surface 12 of the recess.

The method of connecting the inner end of the spoke to the hub is as follows: The bolt 16 is first placed in the recess 14. The end of the spoke is then inserted into the socket and then the wedge is placed to cooperate with the inclined surface 11 of the recess and with the bolt 16 extending through the aperture 21. The aperture 21 is slightly larger than the bolt in order to provide a loose fit and to take up any wear that might occur to either the inner end of the spoke or the recess surface of the socket. The nut 23 is then screwed upon the bolt and tightened thereby forcing the wedge into firm and tight engagement with the inner end of the spoke.

The construction is such that any shifting of the spoke with relation to the recess is absolutely prevented because of the wedge surface encountered.

Some changes may be made in the construction and arrangement of the invention above set forth, without departing from the real purpose and spirit thereof, and it is the intention to cover by the following claims, any modified forms of structure or use of equivalents, which may be reasonably included within their scope.

We claim:

1. A hub and spoke connection comprising a socket upon the hub having an inclined surface upon one side of the recess therein, a wedge member cooperating with said inclined surface to jam the inner end of the spoke against the opposite side of the recess and a bolt extending through said wedge and having its head secured in said inclined surface for holding said wedge and hub together.

2. A hub and spoke connection comprising sockets upon said hub, each socket having an inclined surface upon one side of the recess of said socket gradually increasing in the declination thereof until normal to the base as it approaches the other side, said inclined surface having a T-shaped slot therein, a crescent shaped wedge having a passageway therethrough cooperating with said inclined surface for securing a spoke to said socket and a bolt having its head seating in said T-shaped slot and extending through said passageway for securing the wedge and hub together.

3. A hub and spoke connection comprising a socket upon the hub having an inclined surface upon one side of the recess therein, a wedge member cooperating with said inclined surface to jam the inner end of the spoke against the opposite side of the recess and means passing through the wedge member and anchored in the inclined surface for holding the wedge member within the recess.

In testimony whereof we hereunto affix our signatures.

MATHIAS J. ADAMS.
PETER PAUL ADAMS.